Sept. 5, 1950 V. SCATENA 2,521,483
CAMERA OBSCURA
Filed Feb. 5, 1949 2 Sheets-Sheet 1
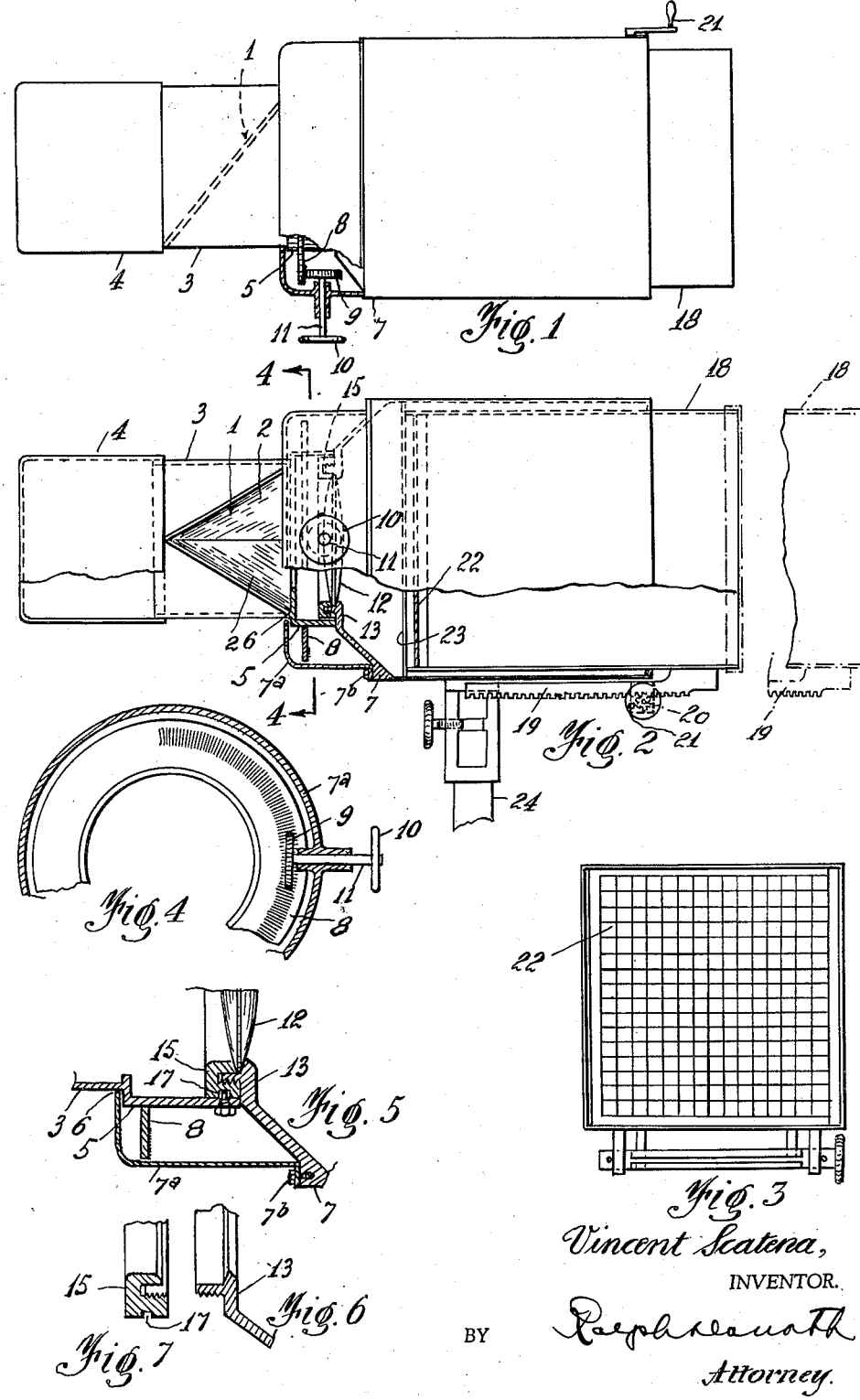
Vincent Scatena,
INVENTOR.
BY Ralph Leanoth
Attorney.

Sept. 5, 1950 V. SCATENA 2,521,483
CAMERA OBSCURA
Filed Feb. 5, 1949 2 Sheets-Sheet 2
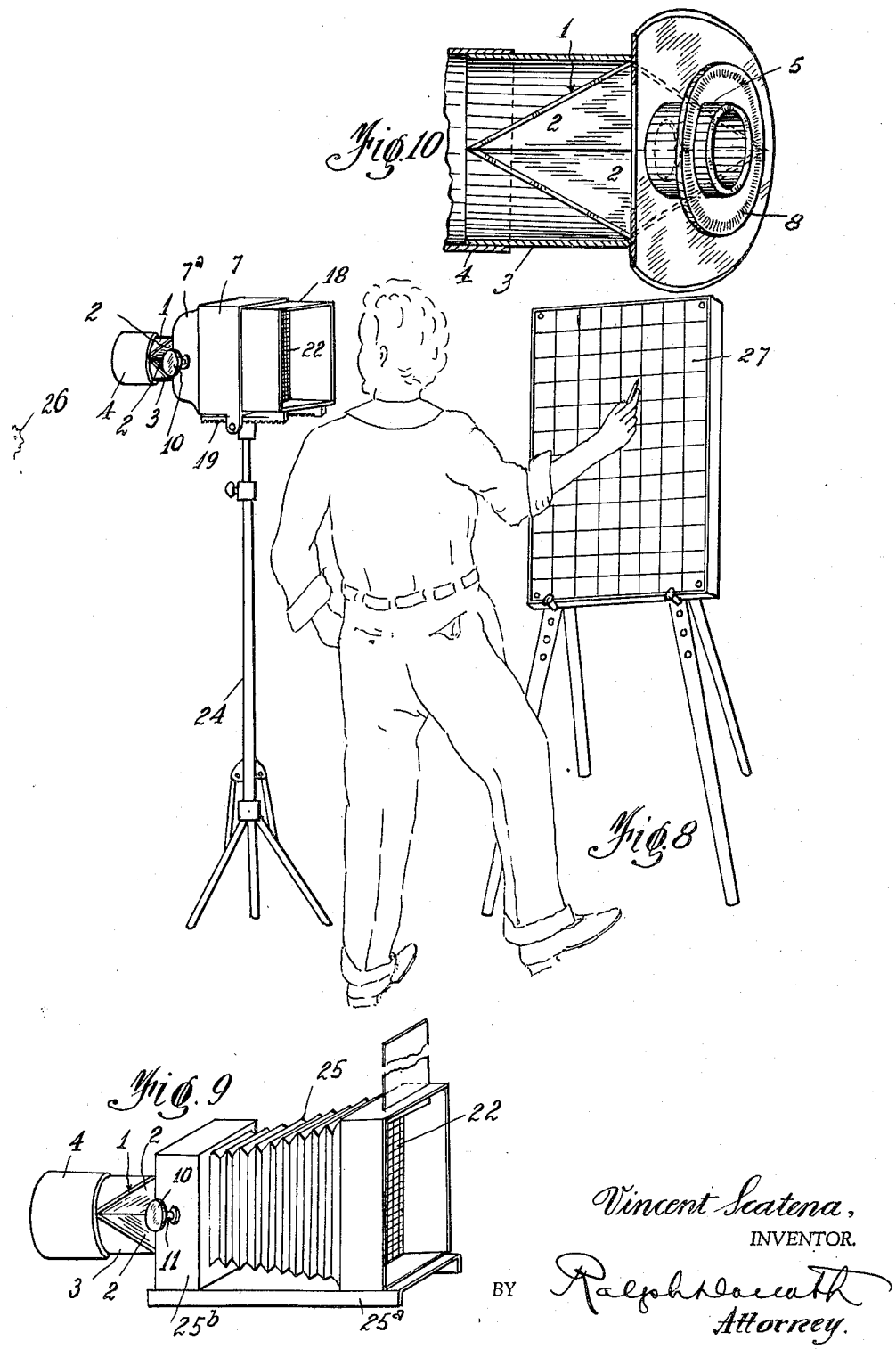

Patented Sept. 5, 1950

2,521,483

UNITED STATES PATENT OFFICE 2,521,483

CAMERA OBSCURA

Vincent Scatena, Pittsburgh, Pa.

Application February 5, 1949, Serial No. 74,769

7 Claims. (Cl. 88—24)

This invention relates to cameras obscura or the like such as are used by artists for reproducing a sketch, drawing, or similar object. It is frequently necessary or desirable for an artist to reproduce an object in a relatively short time. This is particularly true in the case of artists copying and enlarging drawings or photographs on a canvas or illustration board.

I have invented a novel type of camera obscura by means of which artists can readily reproduce and enlarge small objects such as persons, drawings or photographs with great ease and rapidity. Moreover, the camera obscura of my invention is readily adjusted to be directed toward objects lying at varying angles with respect to the camera.

My invention provides a reflecting means having a pair of plane reflecting surfaces intersecting each other at an angle of about 90 degrees along a straight line forming one side of each surface, a double convex lens whose axis intersects the line of intersection of said reflecting surfaces at an acute angle and a translucent, scored screen means divided into a plurality of areas of substantially equal dimensions, and lying in a plane perpendicular to the axis of the lens on the side of the lens opposite the reflecting means. Each of these elements is mounted upon a supporting means so as to be adjustable in position relative to one another. An adjustable focusing and shadow box mounted about the system excludes external light.

In the accompanying drawings illustrating two embodiments of my invention, in which Figure 1 is a top plan view of a camera obscura according to my invention.

Figure 2 is a side elevation of the same camera obscura illustrated in Figure 1.

Figure 3 is an end view looking from the right in Figure 2 and illustrating the scored translucent screen.

Figure 4 is a partial section on line 4—4 of Figure 2 showing the knurled ring and pinion mounting for the reflecting means.

Figure 5 is a partial section through the convex lens and mounting.

Figures 6 and 7 are partial sections of the individual lens mounting rings.

Figure 8 is a perspective view of the camera obscura of my invention illustrating the manner of using it.

Figure 9 is a perspective view of another embodiment of my invention.

Figure 10 is a section through the cover surrounding the reflecting means showing the arrangement of the reflecting surfaces and the rotatable mounting.

Referring first to Figures 1 and 2, I have illustrated a reflecting member 1 made up of a pair of mirrors 2 in the form of isosceles triangles mounted in a rotatable housing 3, so that their reflecting surfaces lie at an angle of 90 degrees to each other and intersect along a line forming their respective bases. The rotatable housing 3 has a sliding cover 4 mounted on one end thereof to protect the reflecting member when not in use. An enlarged shoulder portion 5 on the opposite end of the rotatable housing is adapted to lie within an opening 6 in a shield 7a connected to the body portion 7 of the camera by screws 7b. A knurled ring 8 surrounds the shoulder portion 5 adjacent its junction with the housing and engages a pinion gear 9 which is adapted to rotate the housing and reflecting member. A hand wheel 10 outside of the body portion 7 is connected to the pinion gear by means of a shaft 11 journaled through the side of the shield 7a.

A convex lens 12 is mounted in the body portion 7 by means of an internal mounting ring 13 and an external locking ring 15 threaded thereon. The lens 12 is mounted so that its principal focus lies between it and the intersection of its axis with the mirrors 2, and its axis intersects the junction of the mirrors at an angle of 45 degrees. The shoulder portion 5 of the rotatable housing surrounds the external locking ring 15 and is held in position relative thereto by guide screws 16 sliding in a peripheral groove 17 in the external circumference of the locking ring 15.

A slidable shadow box 18 is mounted within the body portions 7 of the camera. Racks 19 and pinion gear 20 manually operable by means of the handle 21 act to move the shadow box within the camera body. A ground glass screen 22 is mounted within the shadow box adjacent its internal end 23. The screen 22 is divided or scored into a plurality of squares of substantially equal dimensions as illustrated in Figure 3.

The camera body position 7 may be mounted on a tripod or a pedestal 24 for convenience in handling and using.

The sliding box 18 may be replaced by an extensible bellows 25 mounted on a base 25a as shown in the embodiment illustrated in Figure 9. In this embodiment, the camera body 7 and shield 7a are embraced in a single unit 25b. The relation of the other elements remains the same.

The manner of using the camera obscura of my invention is best illustrated by referring to Figure 8 in conjunction with Figure 2. An object 26 is reflected by the mirrors 2 into the lens 12 in the inverted position. Then lens 12, by virtue of its converging nature and the fact that the image on the mirrors is outside its principal focus, again inverts the image so that it appears on the translucent screen 22 in its normal position. The degree of enlargement of the image appearing on the screen 22 is dependent upon the distance between the screen and the lens 12 which is regulated by the movement of the shadow box 18. The image appearing on the screen is divided into many sections by the squares appearing on the screen.

An artist can readily copy the image appearing on the screen by means of a canvas 27 or the like which is divided into similar number of squares as the screen. The portion of the image appearing in a given square of the screen being copied into a like square on the canvas.

It is readily apparent that the camera obscura of my invention has many uses, it will give a true vision in perspective, proportion and color of the objective, the latter may be a landscape, architecture, still life, photograph, painting or living person or animal.

My camera obscura is relatively simple in construction, compact and easily transported and used.

Although I have illustrated a presently preferred embodiment of my invention, it is to be understood that it may be otherwise embodied within the scope of the following claims.

I claim:

1. A camera obscura or the like comprising a reflecting means consisting of a pair of plane reflecting surfaces in the form of isosceles triangles which intersect at an angle of about 90 degrees along a straight line forming a base of each triangle, a convex lens adjacent the reflecting means whose axis intersects the line of intersection of said reflecting surface at an acute angle and whose central plane lies in a plane common to the sides of said triangular reflecting surfaces opposite said line of intersection, a translucent screen means divided into a plurality of areas of substantially equal dimensions, said screen means lying in a plane perpendicular to the axis of the lens and on the side of said lens opposite the reflecting means, and means for adjustably supporting said reflecting means, lens and screen means in relation to one another.

2. A camera obscura or the like comprising a convex lens, lens supporting means, reflecting means rotatable about the axis of said lens, said reflecting means having a pair of plane reflecting surfaces in the form of isosceles triangles intersecting one another at an angle of about 90 degrees along a straight line forming a side of each surface, said line of intersection intersecting the axis of the lens at a point outside the principal focus, the sides of said triangular reflecting surfaces opposite the line of intersection lying in the central plane of the lens, means cooperating with the lens supporting means for rotating the reflecting means about the axis of the lens, translucent screen means divided into a plurality of areas of substantially equal dimensions, said screen means lying in a plane perpendicular to the axis of the lens on the side opposite the reflecting means, and means for holding said screen means in spaced apart relationship with respect to said lens.

3. A camera obscura or the like according to claim 2 in which the means for rotating the reflecting means comprises a knurled ring surrounding the lens supporting means and upon which the reflecting means is mounted and a cooperating pinion gear mounted on the lens supporting means.

4. A camera obscura or the like comprising a convex lens, lens supporting means, reflecting means rotatable about the axis of said lens, said reflecting means having a pair of plane reflecting surfaces in the form of isosceles triangles intersecting one another at an angle of about 90 degrees along a straight line forming a side of each surface, said line of intersection intersecting the axis of the lens at a point outside the principal focus, the sides of said triangular reflecting surfaces opposite the line of intersection lying in a plane common to each other and the central plane of the lens, means cooperating with the lens supporting means for rotating the reflecting means about the axis of the lens, a hollow, extensible member connected at one end to the lens supporting means, and translucent screen means mounted in said hollow extensible member so as to be movable toward and away from the lens, said screen means being divided into a plurality of areas of substantially equal dimensions and lying in a plane perpendicular to the axis of the lens.

5. A camera obscura or the like according to claim 4 in which the hollow extensible member comprises a bellows.

6. A camera obscura or the like according to claim 4 in which the hollow extensible member includes a pair of box like members, open at either end and adapted to fit one within the other and rack and pinion means for moving them with relation to one another.

7. A camera obscura or the like comprising a convex lens, lens supporting means, reflecting means rotatable about the axis of said lens, said reflecting means having a pair of plane reflecting surfaces in the form of isosceles triangles intersecting one another at an angle of 90 degrees along a straight line forming the base of the triangles, said line of intersection intersecting the axis of the lens at a point outside the principal focus of the lens and at an angle of 45 degrees, the sides of said triangular reflecting surfaces opposite the line of intersection lying in a plane common to each other and parallel to the central plane of the lens, a cover slidably mounted about said reflecting means, means cooperating with the lens supporting means for rotating the reflecting means about the axis of the lens, a hollow extensible member connected at one end to the lens supporting means, and ground glass screen means mounted in said hollow extensible member so as to be movable toward and away from the lens, said screen means being divided into a plurality of areas of substantially equal dimensions and lying in a plane perpendicular to the axis of the lens.

VINCENT SCATENA.

REFERENCES CITED

The following references are of record in the file of this patent:

UNITED STATES PATENTS

| Number | Name | Date |
|---|---|---|
| 484,726 | Allen | Oct. 18, 1892 |
| 735,697 | Beebe et al. | Aug. 11, 1903 |
| 752,617 | De Pue | Feb. 16, 1904 |
| 970,947 | Phelps | Sept. 20, 1910 |
| 1,311,253 | Stern | July 29, 1919 |
| 1,928,757 | Klasey | Oct. 3, 1933 |
| 2,100,442 | Herrmann | Nov. 30, 1937 |
| 2,143,125 | Headle | Jan. 10, 1939 |

FOREIGN PATENTS

| Number | Country | Date |
|---|---|---|
| 233,201 | Switzerland | Sept. 16, 1944 |